United States Patent [19]

Meyer et al.

[11] Patent Number: 4,726,728

[45] Date of Patent: Feb. 23, 1988

[54] SELF-UNLOADING BALE BOX

[75] Inventors: Donald A. Meyer; Larry A. Meyer, both of Dorchester, Wis.

[73] Assignee: Meyer's Manufacturing Corp., Dorchester, Wis.

[21] Appl. No.: 729,261

[22] Filed: May 1, 1985

[51] Int. Cl.⁴ .............................................. B65G 67/24
[52] U.S. Cl. .................................... 414/501; 414/492; 414/514; 414/518; 105/243
[58] Field of Search ...................... 414/24.5, 24.6, 501, 414/528, 529, 514, 518, 491, 492; 298/33, 35 R, 28, 36, 31, 34; 105/243

[56] References Cited

U.S. PATENT DOCUMENTS

| | | | |
|---|---|---|---|
| 1,928,859 | 10/1933 | Kutscha | 414/518 |
| 2,233,111 | 2/1941 | Roberts | 414/528 X |
| 2,507,252 | 5/1950 | Hoover . | |
| 2,605,913 | 8/1952 | Hon, Jr. . | |
| 2,640,306 | 6/1953 | Diehl | 414/528 X |
| 3,317,066 | 5/1967 | Hamm . | |
| 3,454,172 | 7/1969 | Carr . | |
| 3,478,905 | 11/1969 | Strid | 414/528 X |
| 3,643,785 | 2/1972 | Bostedt . | |
| 3,756,544 | 9/1973 | Bader . | |
| 3,866,770 | 2/1975 | Palmer . | |
| 3,942,666 | 3/1976 | Pfremmer | 414/501 |
| 4,173,422 | 11/1979 | Baker et al. | 414/528 X |
| 4,345,869 | 8/1982 | King . | |

FOREIGN PATENT DOCUMENTS 1297018  11/1972  United Kingdom ................ 414/528

Primary Examiner—Frank E. Werner
Attorney, Agent, or Firm—Andrus, Sceales, Starke & Sawall

[57] ABSTRACT

A self-unloading bale box has a conveyor mounted in the floor of the box along one side. The conveyor is covered by a series of covering plates that are raised to expose an increasingly larger length of the conveyor as the box is unloaded. The bales are passed to a curved delivery chute.

1 Claim, 4 Drawing Figures

U.S. Patent  Feb. 23, 1988  4,726,728

SELF-UNLOADING BALE BOX

The present invention relates to a bale box having a means for unloading bales of hay or other forage from the box.

A bale box is a wagon with high sides for transporting bales of hay. The bale box is towed behind a baling machine to receive the bales prepared by the machine. The bales are transported to the barn in the bale box where the bales are typically unloaded onto an elevator for delivery to the hay loft. The unloading of the bale box is usually done by hand. This is arduous and time consuming.

The present invention contemplates a self-unloading bale box having a conveyor means for unloading the bales from the bale box for delivery to an elevator or other apparatus. The conveyor means for unloading the bale box may comprise a chain conveyor mounted in the floor of the bale box along one side. The conveyor may be covered by a series of plates that expose an increasingly larger portion of the conveyor as the box is unloaded. The bales are passed to a curved chute that delivers them to the elevator.

The invention will be further understood by reference to the drawings and following detailed description.

Figure 1:
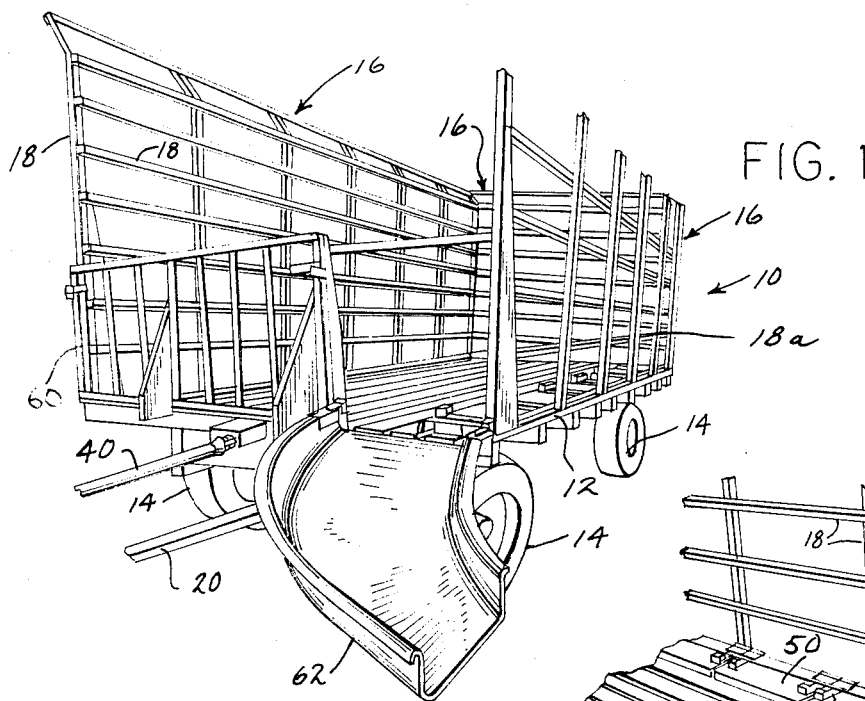
FIG. 1 is a perspective view of the self-unloading bale box of the present invention.

In FIG. 1, the bale box of the present invention is identified by the numeral 10. Bale box 10 has floor 12 supported by a chassis containing wheels 14. Floor 12 may be formed of a plurality of spaced, parallel slats 13 on which the hay bales rest when bale box 10 is loaded.

Along the sides and rear of floor 12 are mounted retaining walls 16, typically formed of spaced tubular members 18. Walls 16 retain the bales of hay on floor 12. Draw bar 20 permits bale box 10 to be towed by other vehicles such as a baler or tractor.

Figure 2:
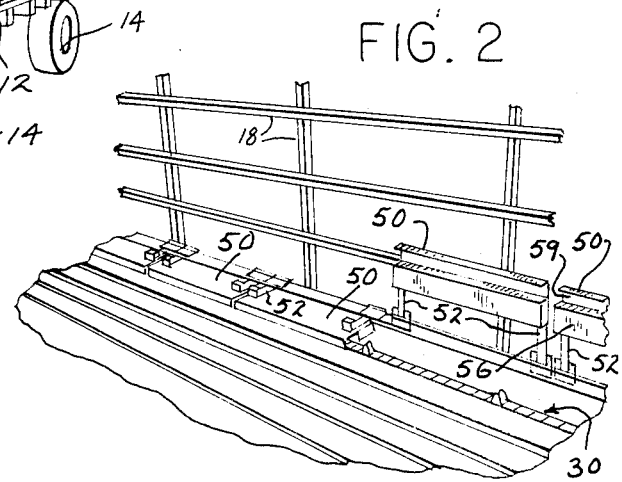
FIG. 2 is a partial perspective view showing the unloading conveyor mounted in the floor of the bale box.
Figure 3:
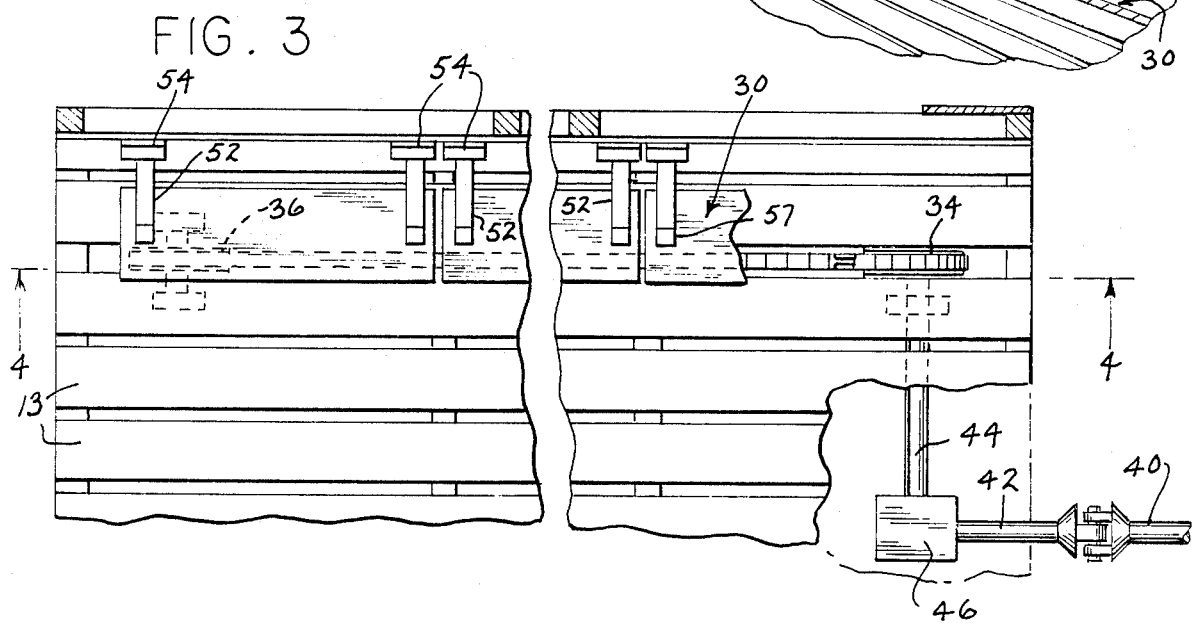
FIG. 3 is a fragmentary top view of the floor of the bale box showing further details of the conveyor.
Figure 4:
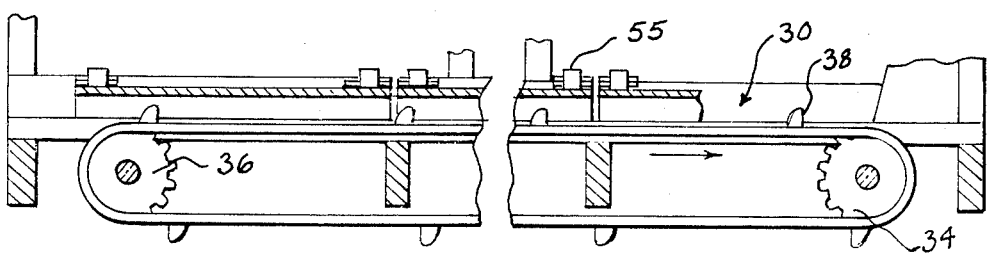
FIG. 4 is a cross-sectional view taken along the line 4—4 in FIG. 3.

As shown most clearly in FIGS. 2, 3, and 4, conveyor 30 is mounted in floor 12 for unloading bales of hay from bale box 10. Conveyor 30 includes a conveyor chain 32 formed of a plurality of links and extending between front drive sprocket 34 and rear idler sprocket 36. A plurality of cleats 38 are mounted at spaced intervals along chain 32 to extend above the plane of floor 12, through a slot such as that existing between two slats 13. Drive sprocket 34 may be driven from the power take off shaft 40 of a tractor through shafting 42–44 and gear box 46.

A plurality of plates 50 are hinged along one side of bale box 10. The length of each of plates 50 may correspond roughly to the length of a bale of hay. As shown in FIG. 2, plates 50 may be raised to expose chain 32 or lowered to cover the chain.

Each plate 50 has a pair of straps 52, connecting the plate to hinges 54 located at the side of floor 12. The ends of straps 52 terminate in an upstanding portion 55. The upper end of portion 55 terminates in a flange 57 extending towards hinge 54. Portion 55 and flange 57 clip over the lowermost horizontal member 18a to retain plate 50 in the raised position. Portion 55 and flange 57 maybe grasped to raise and lower plate 50. Each plate 50 also includes a box-like section 56 resting on floor 12 and a channel section 59 through which projections 38 of chain 32 pass when plates 50 are lowered.

A low wall 60 extends along the front of bale box 10. The portion of wall 60 adjacent conveyor 30 is removable. A curved chute 62 is removably fastened to bale box 10 in front of conveyor 30.

In use, bale box 10 is towed behind a baler as the baler moves through the field. All plates 50 are in the lowered position. Bale box 10 receives the bales of forage formed by the baler. The bales are stacked in bale box 10 commencing at the rear of floor 12 and moving to the front. The bales are typically stacked as high as walls 16.

When bale box 10 is full of bales, it is towed to the barn. The portion of wall 60 in front of conveyor 30 is removed and chute 62 is affixed to the front of bale box 10, as shown in FIG. 1. The unattached end of chute 62 may rest above an elevator leading to the hayloft of the barn. Shaft 42 is connected to the power take off of a tractor by shaft 40.

The bales immediately adjacent the front of bale box 10 and chute 62 are shoved down the chute for delivery to the elevator. When the front portion of bale box 10 has been cleared of bales, the forwardmost one or two plates 50 are lifted up and retained in the raised position by clipping portion 55 and flange 57 of straps 52 over member 18a. Shaft 40 is powered to drive conveyor chain 32 so that the upper horizontal run moves from the rear of bale box 10 to the front. The bales are then placed on top of conveyor chain 32. The bales are engaged by cleats 38 projecting above floor 12, moved to the front of bale box 10, and discharged from the bale box down chute 62.

As the unloading of bale box 10 continues, additional ones of plates 50 are raised to expose more of conveyor chain 32 to move bales in the center and rear portions of bale box 10 to the front of the bale box and discharge them down chute 62. At the end of the unloading process, all plates 50 will be raised.

After the bale box has been completely unloaded, the drive for conveyor chain 32 is disconnected and plates 50 are lowered to cover conveyor chains 32. The bale box is then returned tot he field for a new load of bales.

Various modes of carrying out the invention are contemplated as being within the scope of the following claims particularly pointing and distinctly claiming the subject matter which is regarded as the invention.

We claim:

1. A self-unloading bale box for forage bales, said bale box having a front, a rear, and a pair of sides comprising:
   a wheeled chassis supporting a floor for receiving the bales and walls for retaining the bales on the floor;
   a conveyor chain mounted beneath said floor and having an upper run extending from the rear to the front of the bale box, said chain having means for engaging bales resting on said floor;
   a plurality of plates hinged for movement between a first position covering a portion of said chain and a second position exposing a portion of the upper run of said conveyor chain, said conveyor chain being completely covered when all of said plates are in the first position and completely exposed when all of said plates are in said second position;

means for retaining said plates in said second position comprising an upstanding portion on the hinge connected to each said plate, said upstanding portion being provided with a flange extending toward the hinge for engaging the side of the bale box to retain each said plate in said second position;

drive means for moving the upper run of said conveyor chain in a direction from the rear of said bale box to the front; and a chute removably attached to the front of said bale box adjacent said conveyor chain.

* * * * *